May 18, 1926.

L. D. LOVEKIN

SAFETY VALVE FOR WATER HEATERS

Filed March 13, 1924

1,585,253

INVENTOR
Luther D. Lovekin.
BY
HIS ATTORNEY

Patented May 18, 1926.

1,585,253

UNITED STATES PATENT OFFICE.

LUTHER D. LOVEKIN, OF ARDMORE, PENNSYLVANIA.

SAFETY VALVE FOR WATER HEATERS.

Application filed March 13, 1924. Serial No. 698,833.

My invention relates to emergency safety valves used in connection with water heaters and operating to cut off the flow of fuel gas when the water has reached a determined temperature, of course, a higher temperature than is normally expected of the heater. The object of my invention is to provide a commercial safety valve appliance characterized by simplicity and cheapness of construction, and, at the same time, efficient and reliable in operation.

The nature of my improvements will be best understood as described in connection with the drawings in which they are illustrated and in which—

Figure 1:
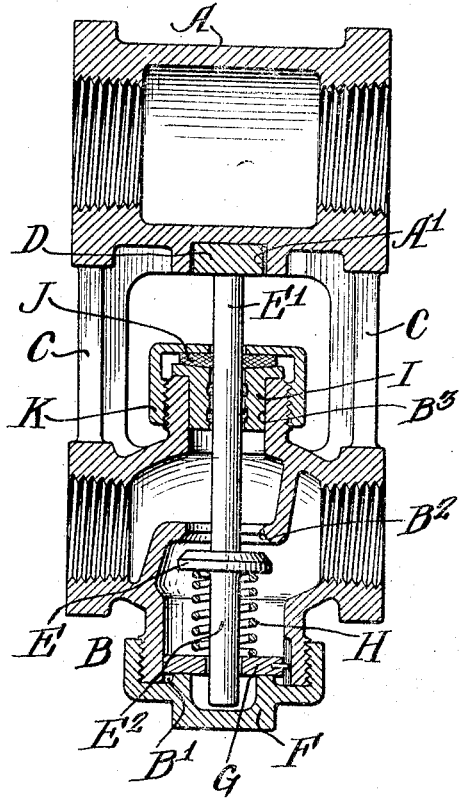
Figure 2:
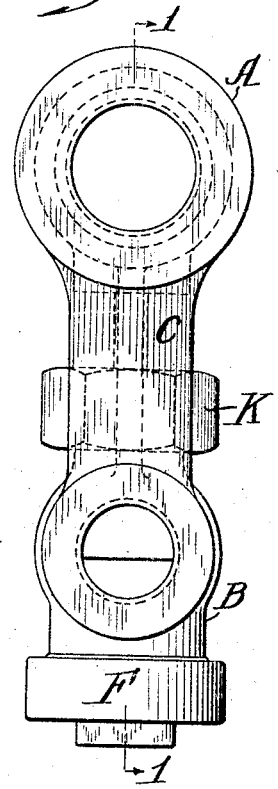

Figure 1 is a sectional elevation of my device taken as on the line 1—1 of Fig. 2, and Figure 2 is an end view of the appliance A indicates the water fitting member of the appliance intended to be connected to a water heater using gas as a fuel. B is the gas valve casing through which the gas passes on its way to the opening, not shown, this casing being preferably formed in an integral with the water fitting and connected thereto by webs indicated at C, C. $B^1$ is an opening into the outside of the valve casing. $B^2$, the valve opening and $B^3$ the stuffing box, while at $A^1$ I have shown a socket which is fitted into the outer portion of the metal of the water fitting and in which is located, in close contact with the metal of the socket, a plug D of fusible material, that is, of material which will melt when the temperature of the water in the fitting A reaches a determined point. The openings $B^1$, $B^2$, and $B^3$, of the socket $A^1$, are located in alignment with each other and the valve opening $B^2$, stuffing box $B^3$ and socket $A^1$, are all of the same diameter so that they can be bored out by a single tool and at a single operation. E is the gas valve having connected with it the valve stem $E^1$ which extends through the stuffing box and into contact with the plug D, the length of this stem being such that when it is in contact with the plug, as shown, it holds the valve E open. $E^2$ is a rear extension of the valve stem. F is a screw cap closing the opening $B^1$ and supporting the disc G which in turn supports a coil spring H, which presses against the valve in a direction to close it and which normally holds the valve stem $E^1$ in contact with the plug D. K is a stuffing box gland, J a washer and $K^1$ a screw cap forming a stuffing box for the valve stem $E^1$.

Te normal position of the parts is as shown in Fig. 1, the plug D being in close contact with the walls of the socket $A^1$ so that the heat of the water in the fitting A will be freely transmitted to the plug. When the temperature of the water rises to a determined point, the plug D fuses and the coil spring H forces the valve to its seat, the depth of the socket A being, of course, sufficient to permit the valve stem to move freely into it until the opening is closed.

It will be observed that my device is of great simplicity, requiring a minimum amount of machining, that the movable parts are freely accessible, and that my construction involves no perforation into the water fitting for the passage of the valve stem.

Having now described my invention, what I claim as new and desire to secure by Letters Patent, is:

1. A metal water fitting having a plug holding socket formed in the outside of the wall, in combination with a fusible plug fitting in said socket, a gas valve casing, means securing the said casing to the fitting, a valve for shutting off the gas, a valve stem secured to said valve and normally abutting against the fusible plug when the valve is open and a spring acting to press the stem against the plug and to close the valve when the plug fuses.

2. An integral metal casting comprising a water fitting and a gas valve casing spaced and united by webs, said casting having an opening through the wall of the valve casing, a valve opening, a stuffing box opening and a plug holding socket in the wall of the water fitting, all in alignment with each other, in combination with a fusible plug fitting in the socket of the water fitting, a valve having a valve stem which extends through the stuffing box and normally abuts against the fusible plug holding the valve open, a gland and packing in the stuffing box opening, a cap for closing the opening in the outer wall of the valve casing and a spring acting to seat the valve when the plug fuses.

3. An integral metal casting comprising a water fitting and a gas valve casing spaced and united by webs, said casting having an opening through the wall of the valve casing, a valve opening, a stuffing box opening and a plug holding socket in the wall of the water fitting, all in alignment with each other, said valve opening, stuffing box opening and socket being of equal diameter, in combination with a fusible plug fitting in the socket of the water fitting, a valve having a valve stem which extends through the stuffing box and normally abuts against the fusible plug holding the valve open, a gland and packing in the stuffing box opening, a cap for closing the opening in the outer wall of the valve casing and a spring acting to seat the valve when the plug fuses.

LUTHER D. LOVEKIN.